Jan. 19, 1971    NORIYOSHI ANDO    3,556,612
ANTISKID CONTROL APPARATUS FOR VEHICLES
Filed March 11, 1969    2 Sheets-Sheet 1

INVENTOR
Noriyoshi Ando
BY Cushman, Darby & Cushman
ATTORNEYS

United States Patent Office 3,556,612
Patented Jan. 19, 1971

3,556,612
ANTISKID CONTROL APPARATUS FOR VEHICLES
Noriyoshi Ando, Kariya-shi, Japan, assignor to Nippon Denso Company Limited, Kariya-shi, Japan, a corporation of Japan
Filed Mar. 11, 1969, Ser. No. 806,148
Claims priority, application Japan, Mar. 15, 1968, 43/16,992
Int. Cl. B60t 8/12
U.S. Cl. 303—21                                    1 Claim

ABSTRACT OF THE DISCLOSURE

An antiskid control apparatus for vehicles, comprising a wheel angular deceleration detecting circuit adapted to convert the speed of rotation of wheels into a DC voltage and detect a wheel angular deceleration signal in accordance with said DC voltage, a vehicle body deceleration detecting circuit adapted to detect a vehicle body deceleration signal, a wheel rotation detecting circuit adapted to detect whether or not the wheels are rotating, and a comparator circuit provided at the output side of said wheel angular deceleration detecting circuit and vehicle body deceleration detecting circuit to thereby compare the outputs of said two circuits, wherein if the difference between the wheel angular deceleration signal and the vehicle body deceleration signal goes above a predetermined value, the brake force applied to the wheels is relieved by the output of said comparator and in case the wheels are stopped from rotating during the time when the brake force is relieved, the brake force relieved state is maintained by the output of said wheel rotation detecting circuit until the wheels begin rotating. Thus, with the present apparatus, an optimum brake force can always be obtained even under such conditions that the coefficient of friction between the wheels and the road surface is greatly varied, whereby the vehicle can be efficiently and safely braked.

BACKGROUND OF THE INVENTION

Field of the invention

This invention generally relates to an antiskid control apparatus, and more particularly it pertains to an antiskid control apparatus wherein when the difference in magnitude between the wheel angular deceleration and the vehicle body deceleration goes above a predetermined value when a brake force is imparted to the wheels through braking operation, the brake force of the vehicle is relieved, whether the brake pedal is depressed or not; when the difference between the wheel angular deceleration and the vehicle body deceleration goes below the predetermined value, a brake force is again imparted to the wheels; and in case the wheels are stopped from rotating when the application of a brake force thereto is interrupted, the brake mechanism is made to perform such antiskid controlling operation as to maintain the brake force relieved state until the wheels begin rotating.

Description of the prior art

The function of an antiskid control apparatus for a vehicle is to reduce the speed of the vehicle without stopping the rotation of the wheels when the vehicle is to be braked. With most of the conventional antiskid control apparatus, the angular deceleration (rad/$S^2$) of the wheel driving rotary shaft which is related to the wheel angular deceleration ($m/s^2$) of the vehicle is detected by a flywheel mechanism so that the brake force applied to the wheels is reduced through a hydraulic or electromagnetic type transmission drive mechanism, thereby preventing the brake mechanism from being disabled and the vehicle body from being irregularly turned due to the fact that the wheels are stopped from rotating by an excessive brake force imparted thereto.

FIG. 1 is a block diagram showing the conventional electromagnetic type antiskid control apparatus applied to an air brake system or air servo oil-pressure brake system, and FIG. 2 is an electric circuit diagram of the apparatus of FIG. 1 including a detector for detecting the angular deceleration of the wheel driving shaft. The angular deceleration detector 21 is so designed that when angular deceleration occurs at a rotary shaft 22 coupled to the wheel driving shaft, a rotational torque is produced at a flywheel 23 so that a relative rotational motion is effected between the flywheel 23 and the rotary shaft 22 until a torsion spring 24 is overcome, thus causing the mounting position of the flywheel 23 to be shifted. This rotational motion is effected along the spring so that the flywheel 23 is moved toward the rotary shaft 22 (in the direction indicated by arrow A). This movement is amplified by a lever 25 so as to serve as a drive source for closing electric contacts 26. Numeral 27 represents a relay adapted to pass an electric current from a power source 28 to a brake force relieving valve 29 upon closure of the electric contacts 26. The brake force relieving valve 29 is of the three-way switching type which is so designed that when de-energized, it is communicated with a brake chamber through an air tank and thence a brake valve while when energized, it closes the air tank to cause the brake chamber to be communicated with an air exhaust port. Numeral 30 indicates a lamp for confirming the operation of the aforementioned brake force relieving valve. In the controlling operation of the apparatus, air is introduced from the air tank into the brake chamber through the brake force relieving valve so that a brake force is imparted to the wheels. Upon occurrence of a predetermined angular deceleration at the rotary shaft 22, the brake force relieving valve 29 is energized so that the air pressure in the brake chamber is decreased so that the brake force is weakened. Thus, it is possible to prevent the rotation of the wheel driving shaft from being stopped. However, such apparatus is disadvantageous in that the antiskid controlling operation cannot be satisfactorily performed under such conditions that the coefficient of friction between the wheels and the road surface is greatly varied as in the case where the vehicle, which has been running on a concrete-paved road, is now made to run on a frozen road, since the detection point of the wheel angular deceleration detector is fixed irrespective of the type of road surface so that the range of braking condition is extremely limited. For example, if the detection point of the wheel angular deceleration signal is set to obtain a brake force suitable for the case of a road surface with a high coefficient of friction such as a concrete-paved road surface, then the wheels inevitably tend to be stopped in a very short time due to operational delay of the exhaust system including the brake chamber when the vehicle runs on a frozen road surface with a low coefficient of friction, even if the brake force imparted to the wheels is once relieved. Thus, there occurs such a danger that the vehicle is caused to skid while the wheels are stopped. By setting the detection point of the wheel angular deceleration signal at a very low level, it is possible to prevent the rotation of the wheels from being stopped even when the vehicle runs on a slippery road surface such for example as a frozen road surface. Disadvantageously, however, there arises a problem that the brake stopping distance greatly increases when the vehicle runs on a concrete-paved road surface, so that the intended purpose of the antiskid controlling operation cannot be achieved.

SUMMARY OF THE INVENTION

It is an object of the present invention to provide an antiskid control apparatus for vehicles, comprising a wheel angular deceleration detecting circuit adapted to convert the speed of rotation of wheels into a DC voltage and detect a wheel angular deceleration signal in accordance with said DC voltage, a vehicle body deceleration detecting circuit adapted to detect a vehicle body deceleration signal, a wheel rotation detecting circuit adapted to detect whether or not the wheels are rotating, and a comparator circuit provided at the output side of said wheel angular deceleration detecting circuit and vehicle body deceleration detecting circuit to thereby compare the outputs of said two circuits, wherein if the difference between the wheel angular deceleration signal and the vehicle body deceleration signal goes above a predetermined value, the brake force applied to the wheels is relieved by the output of said comparator, and in case the wheels are stopped from rotating during the time when the brake force is relieved, the brake force relieved state is maintained by the output of said wheel rotation detecting circuit until the wheels being rotating.

In accordance with the present invention, it is always possible to safely and effectively brake a vehicle with a relatively simple circuit arrangement, under such conditions that the coefficient of friction between the wheels and the road surface is greatly varied as in the case where the vehicle, which has been running on a concrete-paved road, is now made to run on a frozen road for example.

DESCRIPTION OF THE PREFERRED EMBODIMENT

Figure 1:
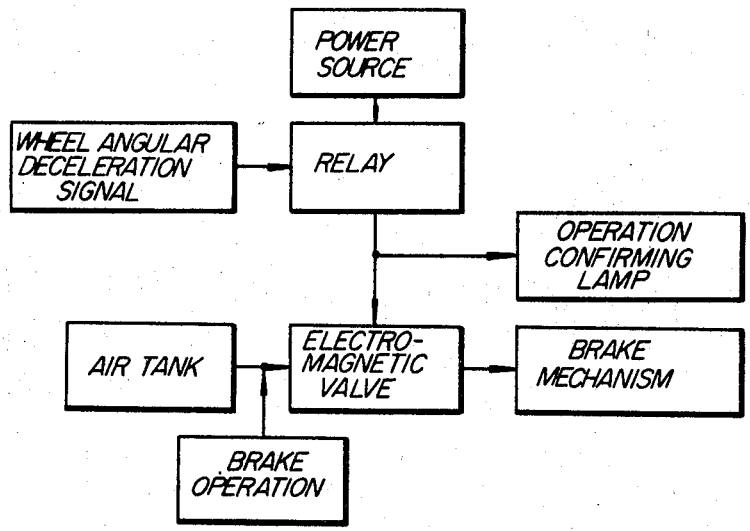
FIG. 1 is a block diagram showing the conventional antiskid control apparatus for vehicles.
Figure 2:
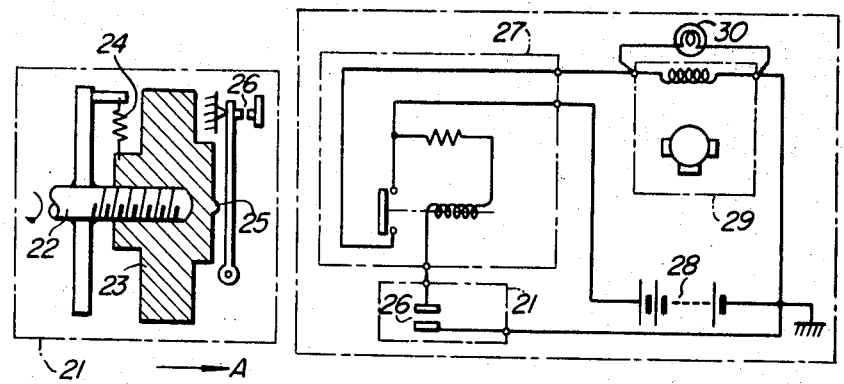
FIG. 2 is an electrical connection diagram showing the conventional electromagnetic type antiskid control apparatus for vehicles.
Figure 3:
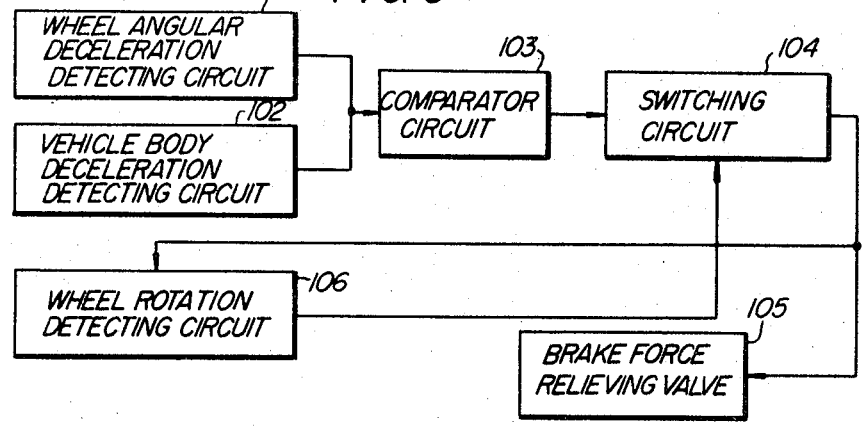
FIG. 3 is a block diagram showing the antiskid control apparatus for vehicles according to the present invention.

First of all, the outline of the present invention will be described with reference to FIG. 3. Wheel angular deceleration and vehicle body deceleration signals available from wheel angular deceleration and vehicle body deceleration detecting circuits 101 and 102 respectively are compared with each other in a comparator circuit 103 provided in back of said detector circuits 101 and 103. When the difference between the two signals goes beyond a predetermined level, a switching circuit 104 is driven by the output of the comparator circuit 103, whereby a braking force relieving valve 105 is actuated to relieve a braking force imparted to the vehicle. In case the wheels are stopped from rotating during the time when the braking force is relieved, the switching circuit 104 is rendered operative by the output of a wheel rotation detecting circuit 106 which is separately provided, thus maintaining the braking force relieved state.

Figure 4:
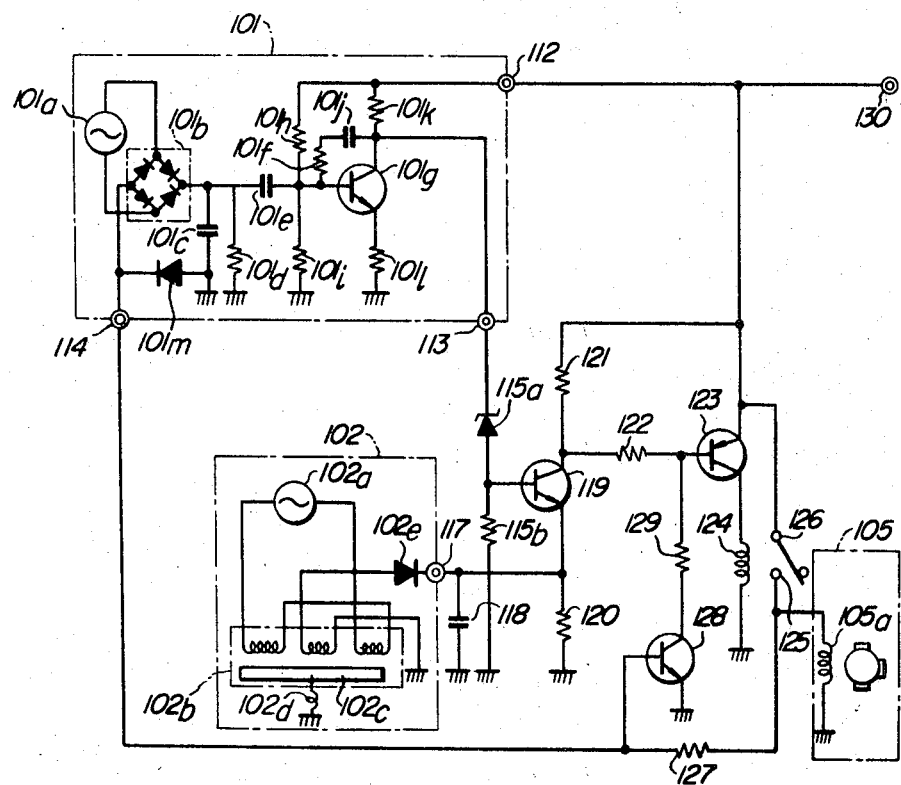
FIG. 4 is an electrical connection diagram showing the antiskid control apparatus for vehicles according to an embodiment of the present invention.

The present invention will now be described in detail with respect to the embodiment shown in the drawings. Referring to FIG. 4, reference numeral 101 represents a wheel angular deceleration detecting circuit, and 101a and AC generator associated with the rotating shaft of the wheels and which is so designed as to produce an AC voltage which is proportional to the speed of rotation of the wheels. Numeral 101b denotes a bridge rectifier circuit, 101c a capacitor, and 101d a resistor. A capacitor 101e and a resistor 101i constitute a differentiating circuit which is adapted to take out a changing component of a DC voltage occurring across the resistor 101d. Numeral 101g indicates a transistor, and 101h and a resistor which is adapted to supply a base current to the transistor 101g. Numeral 101j represents a capacitor having one end thereof connected with the collector electrode of the transistor 101g and the other end thereof connected with one end of the resistor 101f, thereby blocking a DC voltage occurring at the collector electrode of the transistor 101g. Numeral 101k denotes a collector resistor 101g, and 101l an emitter resistor therefor. Numeral 101m shows a diode serving as an element for detecting the rotation of the wheels. Numeral 112 indicates a power source voltage supply terminal of the wheel angular deceleration detecting circuit, 113 an output terminal at which the wheel angular deceleration signal available from the wheel angular deceleration detecting circuit appears, and 114 an outut terminal at which the wheel rotation signal appears and which is connected with the cathode of the diode 101m. Numeral 115a represents a constant voltage diode, 115b a resistor, 102 a vehicle body deceleration detecting circuit, 102a and AC voltage generating circuit, 102b, a differential transformer, 102c a movable core of the differential transformer, and 102d a spring for attaching the movable core to the vehicle body (not shown). Numeral 117 indicates an output terminal of the vehicle body deceleration detecting circuit 102, and 118 a smoothing capacitor having one end thereof connected with the output terminal 117 and the other end thereof grounded. Numeral 119 indicates a transistor, 120 an emitter resistor for the transistor 119, and 121 a collector resistor for the transistor 119. The comparator circuit 103 (FIG. 3) is constituted by the constant voltage diode 115a, resistor 115b, transistor 119, and emitter resistor 120. Supplied to the base electrode of the transistor 119 is a wheel angular deceleration signal from the output terminal 113 of the wheel angular deceleration detecting circuit 101 through the constant voltage diode 115a and resistor 115b, and a vehicle body deceleration signal available from the output terminal of the vehicle body deceleration detecting circuit is supplied to the emitter electrode of the transistor, so that a signal voltage occurs at the collector electrode. Numeral 122 denotes a resistor, and 123 a transistor. The resistor 122 is inserted between the collector electrode of the transistor 119 and the base electrode of the transistor 123. Numeral 124 represents a relay coil, 125 a fixed contact, and 126 a movable contact which is adapted to be brought into engagement with the fixed contact 125 by energizing the relay coil 124. The switching circuit 104 (FIG. 3) is constituted by the transistor 123, relay coil 124, fixed contact 125 and movable contact 126. Numeral 127 indicates a resistor, and 128 a transistor which constitutes the aforementioned wheel rotation detecting circuit 106 (FIG. 3) with the diode 101m and so forth. When the signal voltage at the output terminal 114 of the wheel rotation detecting circuit 106 becomes extinct while the movable contact 126 is engaged with the fixed contact 125, a base current from a power source battery (not shown) is caused to flow into the base of the transistor 128 through the contacts 125 and 126 and resistor 127, so that the transistor 128 is rendered conductive. Numeral 129 shows a collector resistor for the transistor 128, one end of the resistor 129 being connected with the collector electrode of the transistor 128 and the other end thereof with the base electrode of the transistor 123. Numeral 105 indicates a braking force relieving valve, and 105a a drive coil of the braking force relieving valve. The braking force relieving valve 105 is so designed as to relieve a braking force applied to the wheels when a current is supplied to the drive coil 105a. Numeral 130 denotes a terminal connected with the positive electrode of a power source battery (not shown).

The operation of the foregoing apparatus according to the present invention will be described below. Description will first be made of the antiskid controlling operation when the vehicle body deceleration reaches the maximum value depending upon the condition of the ground surface. When the vehicle body is decelerated upon application of a brake force through the braking operation, the deceleration is detected by the differential transformer 102b of the vehicle body deceleration detecting circuit 102, and thereupon a vehicle body deceleration signal voltage (referred to as signal voltage A hereinafter) proportional to the deceleration of the vehicle body is produced across the emitter resistor 120 of the transistor 119 constituting the comparator circuit 103. On the other hand, the wheels are subjected to a slip which depends upon the magnitude of a frictional force occurring between a road surface and the wheels and the magnitude of a braking force imparted to the wheels, so that angular deceleration is caused at the wheels. Thereupon, a signal representing this phenomenon appears between the output terminals of the AC generator 101a incorporated in the wheel angular deceleration detecting circuit 101, and subsequently a change in the voltage across the resistor 101d which results from a decrease in the output of the generator 101a is detected by a differentiating circuit constituted by the capacitor 101e and 101i. As a result, a wheel angular deceleration signal (referred to as signal voltage B hereinafter) is obtained at the output terminal 113. The slip of the wheels increases rapidly when it exceeds a predetermined ratio, so that the angular deceleration of the wheels is also increased in proportion thereto. On the other hand, the vehicle body deceleration increases in accordance with the wheel slip until the latter reaches a predetermined ratio, but when the slip ratio becomes higher than the predetermined value, the vehicle body deceleration decreases on the contrary. Thus, if the wheel slip ratio exceeds such predetermined value, then the difference between the signal voltage A occurring across the emitter resistor 120 and the signal voltage B occurring at the output terminal 113 goes above a predetermined value. At this point, the signal voltage B at the output terminal 113 is supplied to the base of the transistor 119 through the constant voltage diode 115a, thus rendering the transistor 119 conductive. As a result, the transistor 123 is also rendered conductive so that a current is supplied to the relay coil 124 connected with the collector of the transistor 123, thus closing the fixed contact 125 and movable contact 126 which are normally open, with the result that a current is supplied to the drive coil 105a of the braking force relieving valve 105. Consequently, the braking force relieving valve 105 acts to relieve the braking force applied to the vehicle. When the difference between the signal voltage B and the signal voltage A divided by the constant voltage diode 115a and resistor 115b goes below the predetermined value, the transistor 119 is returned to the original non-conducting state, and at the same time the transistor 123 also rendered non-conductive, so that the fixed contact 125 and movable contact 126 are disengaged. Thus, the drive coil 105a is deenergized so that a braking is again imparted to the wheels. In this case, the maximum value of the signal voltage A varies in proportion to the coefficient of friction between the road surface and the wheels, while the signal voltage B occurring at the output terminal 113 is in reverse proportion to the coefficient of friction between the road surface and the wheels and in proportion to the magnitude of the braking force applied to the wheels. Thus, by relieving the braking force of the vehicle when the difference between the signal voltage A and the signal voltage B goes above the predetermined value, it is always possible to perform proper brake force relieving operation even under conditions where the coefficient of friction between the road surface and wheels is greatly varied as in the cases where the vehicle which has been running on a concrete-paved road is now caused to run on a frozen road for example.

In case the coefficient of friction between the road surface and the wheels is low, as in the case where the vehicle runs on a frozen road for example, when the brake force relieving valve 105 is actuated in order to relieve the brake froce of the vehicle through the aforementioned antiskid operation, then there is the possibility that the wheels tend to be stopped from rotating due to operational delay of the exhaust system including the brake chamber. Description will be made of such case. When the brake force is relieved, the movable contact 126 is disposed in engagement with the fixed contact 125, and due to the fact that the wheels are stopped from rotating, no signal voltage to make the base of the transistor 128 negative is available at the output terminal 114. Thus, a base current is caused to flow in the base of transistor 128 from the terminal 130 connected with the positive terminal of the power source battery through the movable and fixed contacts 126 and 125 which are in engagement with each other and the resistor 127, whereby the transistor 128 is render conductive. Subsequently, a base current is caused to flow in the transistor 123 through the collector resistor 129. The transistor 123 is still maintained in the conducting state by the output of the wheel rotation detecting circuit 106 even after the signal voltage B at the output terminal 113 has become extinct due to the fact that the wheels are stopped from rotating, so that the brake force relieving valve 105 is made to continue relieving the brake force of the vehicle until the wheels are again rotated. By repeating the foregoing operation until the vehicle speed is reduced to zero, the vehicle can be stopped without skidding.

What is claimed is:

1. An antiskid control apparatus for vehicles having wheels and a braking system therefor, comprising a wheel angular deceleration detecting circuit adapted to convert the speed of rotation of said wheels into a DC voltage and detect a wheel angular deceleration signal in accordance with said DC voltge, a vehicle body deceleration detecting circuit adapted to detect a vehicle body deceleration signal, a wheel rotation detecting circuit adapted to detect whether or not the wheels are rotating, and a comparator circuit provided at the output side of said wheel angular deceleration detecting circuit and vehicle body deceleration detecting circuit to thereby compare the outputs of said two detecting circuits, wherein when the difference between said wheel angular deceleration signal and said vehicle body deceleration signal goes above a predetermined value, the brake force applied to the wheels by said braking system is relieved by the output of said comparator circuit, and in case the wheels are stopped from rotating during the time when the brake force is relieved, the brake force relieved state is maintained by the output of said wheel rotation detecting circuit until the wheels begin rotating.

References Cited

UNITED STATES PATENTS

| 3,245,727 | 4/1966 | Anderson et al. | 303—21 |
| 3,467,443 | 9/1969 | Okamoto et al. | 303—21 |

MILTON BUCHLER, Primary Examiner

J. J. McLAUGHLIN, Assistant Examiner

U.S. Cl. X.R.

188—181